Jan. 16, 1968   W. C. ROESE   3,363,797
PROTECTIVE COVER
Filed Feb. 17, 1965
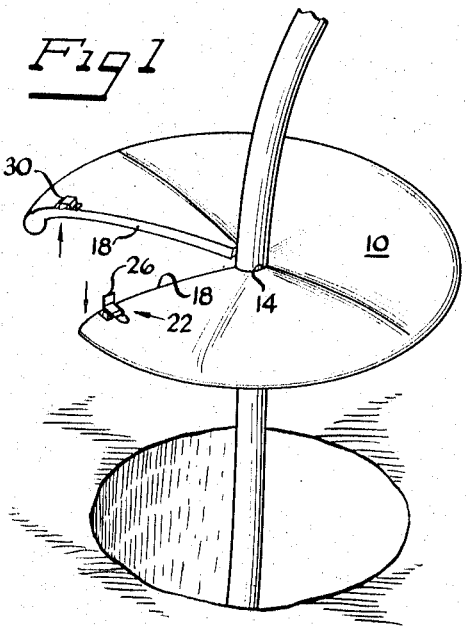
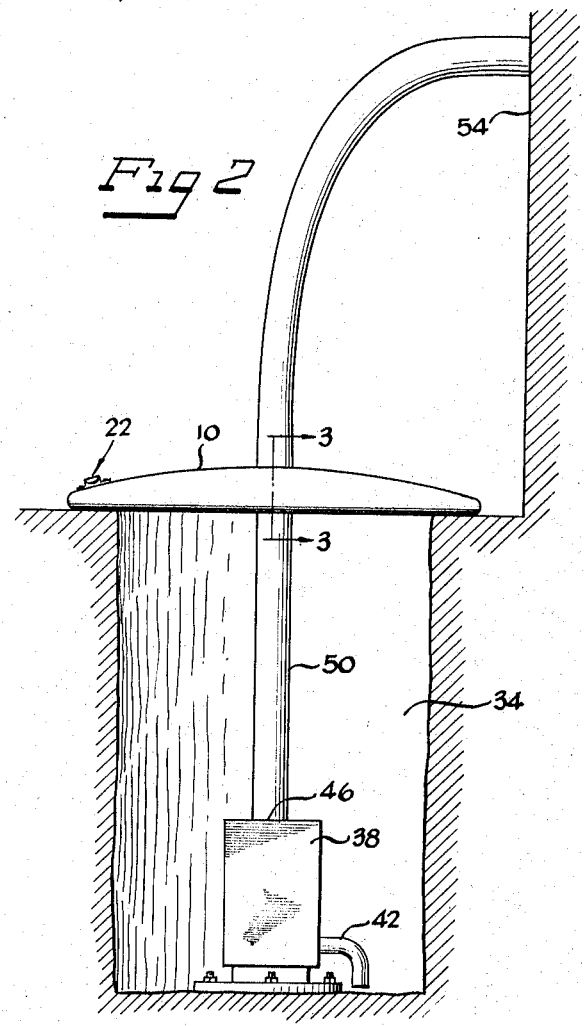
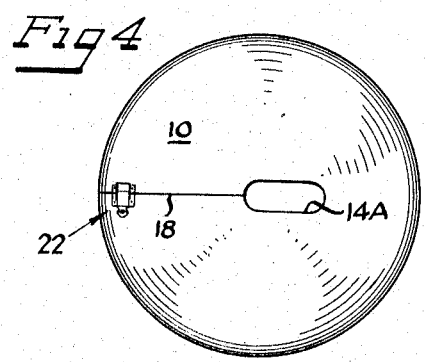
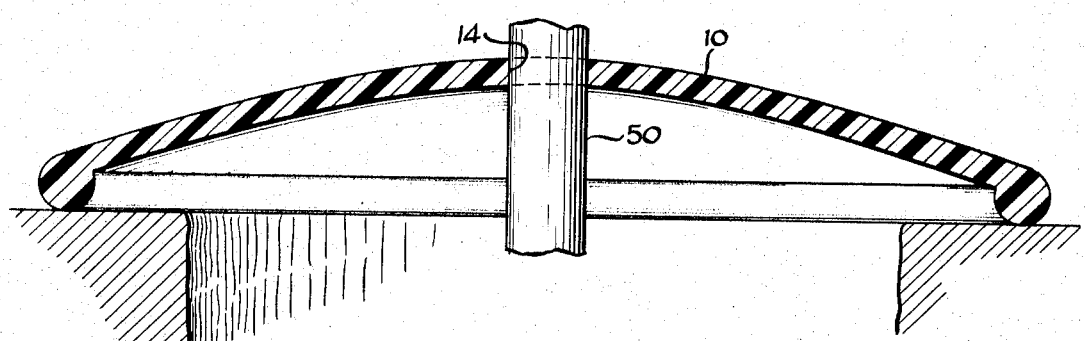
Inventor
William C. Roese
By Anderson, Luedeka, Fitch, Even & Tabin
Atty's

United States Patent Office 3,363,797
Patented Jan. 16, 1968

3,363,797
PROTECTIVE COVER
William C. Roese, 3359 Bush Drive,
Bay City, Mich. 48706
Filed Feb. 17, 1965, Ser. No. 433,390
1 Claim. (Cl. 220—24)

The present invention relates generally to protective covers for sunken shafts, and more particularly, to a protective cover having an aperture adapted to conveniently receive conduits, discharge pipes, electrical cables, etc., extending from a shaft over which the cover is disposed.

Generally shafts such as those provided for use with apparatus such as a sump pump are in the form of fairly wide sunken shafts located in the ground or flooring of an area. Typically, such shafts or sumps are located in a relatively accessible area so that water or other fluids may flow into the shaft, rather than accumulating and flooding the surrounding area. Normally, a pump is disposed near the bottom of such a shaft. The pump generally is connected to an outlet conduit or discharge pipe which extends out through the top of the shaft so that the evacuated fluid may be removed from the shaft and appropriately eliminated. In addition, an electrical cable may be connected to the pump, and extend out of the shaft adjacent to the discharge pipe to a suitable source of electricity. Usually the discharge pipe is coupled to a sewer or other such waste removal apparatus to which the fluid is conveyed for disposal. The presence of cables, pipes for disposing of the discharged fluid, etc. makes it quite difficult to conveniently cover or protect the open shaft or sump.

Often if a shaft similar to that described above is left unprotected it may be quite dangerous since children, pets, and even adults may inadvertently step into the shaft and become seriously injured. Moreover, the presence of such an opening may be quite deleterious to the esthetic qualities of the area in which the shaft is located. Furthermore, items such as pumps which are placed within such a shaft often produce substantial amounts of noise particularly when coupled with sounds such as flowing water. By disposing a suitable cover over the top of the shaft the foregoing disadvantages are substantially overcome.

Accordingly, it is an object of the present invention to provide a cover which is particularly adapted for convenient installation on a shaft which includes externally extending conduits.

It is another object of the present invention to provide a protective shaft cover having a centrally located aperture which is conveniently accessible for being placed in surrounding relationship with pipes, cables, etc. when the cover is disposed on an open shaft.

It is another object of the present invention to provide a generally circular protective shaft cover having a radial slit and a centrally located aperture, which is accessible through skewed or oblique bending apart of radial segments of the cover adjacent the slit so that the cover may be readily disposed on an open shaft from which a pipe extends.

It is still another object of the present invention to provide a protective shaft cover which is relatively simple to install, durable in use, and attractive in appearance.

Other objects and advantages of the present invention will become apparent from the following detailed description when considered in conjunction with the accompanying drawings wherein:

FIGURE 1 is a perspective view of a device constructed in accordance with the present invention illustrating the manner by which communication with the centrally located aperture may be accomplished.

FIGURE 2 is a sectional view of a preferred embodiment of the present invention, showing the device disposed on a sump hole containing a pump connected to an outwardly extending discharge pipe.

FIGURE 3 is an enlarged sectional view taken along line 3—3 of FIGURE 2.

FIGURE 4 is a plan view of an alternative embodiment of the present invention having a noncentrally located aperture.

Referring to the drawings, a device constructed in accordance with the present invention generally includes a main body 10 having a centrally located aperture 14 and a slit 18 extending from the aperture 14 to a point on the outer edge of the cover body 10. The slit 18 generally extends through the body of the cover 10 coextensively with the aperture 14. In addition, a fastener 22 is normally disposed across the slit for maintaining the portions of the body 10 adjacent to the slit 18 from splitting apart when the fastener 22 is in a closed position.

Preferably the body 10 has a generally circular cross-sectional configuration, since it usually is disposed over substantially cylindrically shaped shafts. The body 10 is preferably constructed in a slightly concave shape, which aids in increasing its structural strength. Preferably the cover body 10 is fabricated of a suitable resilient, plastic-like material such as glass-fiber reinforced plastic, thermoformed thermoplastic sheet, etc., which has sufficient resiliency so that the cover body may be bent at the slit and returned to its original shape without fracturing the material as is subsequently explained. However, in certain instances it may be advantageous to fabricate the body 10 of a suitable metallic material.

The aperture 14 is preferably centrally located in the cover body 10 and formed completely through the cover body 10 as shown in the drawings. The aperture 14 is preferably circular in shape so as to conveniently accommodate cylindrical conduits since cylindrical configurations are most commonly encountered. However, if desired the aperture may be formed in other shapes so as to accommodate various equipment, which it is desired to enclose with the cover body 10.

The slit 18 is generally in the form of a radial slit extending from the aperture 14 to a point on the outer circumferential edge of the cover body 10. The slit extends entirely through the cover body 10 so as to permit oblique movement or splitting apart of the portions of the cover body directly adjacent to the slit 18 as shown in FIGURE 1. By virtue of such a provision the application of oppositely directed parallel forces to the portions of the cover body 10 adjacent the slit 18 results in temporary deformation of skewed splitting of the cover body 10 in the region defined by the two surfaces of the slit 18. This permits disposition of the cover on a shaft or the like from which a pipe extends, and is coupled to other apparatus at both ends making it inaccessible to covering by prior art covers. When the forces are removed, the resilient cover returns to its original configuration, and the fastener, which extends across the slit 18, may be secured to maintain the respective portions of the cover body 10 in their original position.

The fastener 22 may be of the conventional latch type variety having a hinged movable portion 26 disposed on one side of the slit 18 and a stationary upwardly extending portion 30 on the other side of the slit 18 directly adjacent to the movable hinged portion 26 so that the movable hinged portion 26 may be placed over the stationary portion 30 to lock the portions of the cover into position.

FIGURE 2 schematically illustrates the disposition of a protective cover in accordance with the present invention, showing it in the position upon a shaft 34 containing a pump 38 having an inlet 42 and an outlet 46, communicating with a discharge pipe 50. Although the cover is shown in the drawings with its rounded end extending outwardly from the shaft and its concave surface disposed adjacent to the shaft, it should be noted that the cover may also be reversed in position so that its rounded end extends into the shaft and its concave surface extends outwardly from the shaft, thereby resulting in a somewhat flatter surface over the shaft if such is desired. This latter configuration may be particularly advantageous when it is desired to make the cover relatively inconspicuous.

As shown, the discharge pipe 50, which is connected to the pump outlet 46, extends upwardly through the open top of the shaft 34 and through the aperture 14 in the cover 10 to a disposal means 54. It would be quite difficult to place a conventional prior art cover over the open top of the shaft without first disconnecting the discharge pipe 50 from either the pump outlet 46 or the disposal means 54 so that it may be inserted through the aperture.

However, by splitting apart the cover at the slit 18 as previously described communication between the aperture 14 and the outer edge of the cover 10 is provided. Thus, the pipe 50 may be readily inserted into the aperture 14 through the slit 18 and the cover 10 may be conveniently disposed onto the shaft. After the cover has been placed in position the fastener 22 is closed.

In FIGURE 4 an alternative embodiment of the present invention is illustrated, which is adaptable for disposition on a shaft containing a non-centrally located conduit. An aperture 14a is provided, which extends a predetermined distance from the center of the body 10, and communicates with the outer edge of the body 10 through the slit 18 as previously described. The provision of the elongated aperture 14a permits convenient disposition of the cover on a shaft from which a non-centrally located conduit extends.

Thus, a highly convenient protective device has been provided which is particularly adaptable for disposition on sumps, shafts, etc. from which there extend pre-existing conduits, pipes, cables, etc.

Various other changes and modifications may be made in the above-described apparatus without deviating from the spirit or scope of the present invention. Various features of the invention are set forth in the following claim.

I claim:

1. In sump means which includes a sunken shaft, pump means adjacent the bottom of the shaft, and a pump discharge conduit extending upwardly from said pump means of said shaft, the improvement which comprises a protective cover for disposition over the open end of said shaft, said cover having an aperture formed therein and having a slit extending radially outwardly from the aperture to its circumferential edge, said cover being formed of a resilient material so that it may be temporarily deformed by skewed movement along the slit to permit said cover to be disposed over said shaft in surrounding relation to the discharge conduit, the aperture in said cover cooperatively engaging the fixed discharge conduit so that only restricted movement of said cover relative to said shaft is permitted.

References Cited
UNITED STATES PATENTS

| 2,999,479 | 9/1961 | Carder | 174—139 |
| 3,134,188 | 5/1964 | Petersen | 174—66 |

FOREIGN PATENTS 506,717   6/1939   Great Britain.

DONALD F. NORTON, *Primary Examiner.*

THERON E. CONDON, *Examiner.*

J. B. MARBERT, *Assistant Examiner.*